United States Patent
Ganjoo et al.

(10) Patent No.: US 7,441,093 B2
(45) Date of Patent: Oct. 21, 2008

(54) SEGMENTATION MANAGEMENT USING A ROLLING WINDOW TECHNIQUE

(75) Inventors: Afshin Ganjoo, San Jose, CA (US); Christopher N. Conley, West Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 299 days.

(21) Appl. No.: 11/174,072

(22) Filed: Jun. 30, 2005

(65) Prior Publication Data

US 2007/0005921 A1    Jan. 4, 2007

(51) Int. Cl.
*G06F 12/02* (2006.01)
(52) U.S. Cl. .................... 711/165; 711/103; 711/171
(58) Field of Classification Search ................ 711/103, 711/165, 171
See application file for complete search history.

(56) References Cited

U.S. PATENT DOCUMENTS

| | | | | |
|---|---|---|---|---|
| 5,933,845 | A * | 8/1999 | Kopp et al. | 711/103 |
| 6,701,403 | B2 * | 3/2004 | Lary et al. | 710/305 |
| 6,880,022 | B1 * | 4/2005 | Waldspurger et al. | 710/9 |
| 6,968,351 | B2 * | 11/2005 | Butterworth | 707/206 |
| 7,065,607 | B2 * | 6/2006 | England et al. | 711/103 |
| 7,139,896 | B2 * | 11/2006 | Wong | 711/218 |

* cited by examiner

*Primary Examiner*—Sanjiv Shah
*Assistant Examiner*—Daniel Tsui
(74) *Attorney, Agent, or Firm*—Derek J. Reynolds

(57) ABSTRACT

A method, device, and system are disclosed. In one embodiment, the method comprises receiving a code segment to be inserted into a flash memory storing code segments, selecting one or more contiguous code segments in flash memory with a total size equal to or larger than the received code segment, calculating the amount of data movement necessary for the one or more selected contiguous code segments, and if the amount is minimum, moving the one or more selected contiguous code segments and replacing them with the received code segment.

12 Claims, 6 Drawing Sheets

SEGMENTATION MANAGEMENT USING A ROLLING WINDOW TECHNIQUE

FIELD OF THE INVENTION

The invention relates to flash memory segmentation management.

BACKGROUND OF THE INVENTION

Flash memory devices are being used in more devices as their storage size increases and they become faster. Currently, flash memory is used as a medium for storing code segments. Code segments cannot be divided and stored in multiple locations within memory, rather they must be stored in a contiguous block of memory. The addition and removal of code segments to and from flash creates unique issues. A new code segment must have enough room in flash memory to be stored contiguously, similar to segmentation issues with any type of media. However, unlike other media, stored code segments have high overhead when they are moved around to create enough empty space to make room for a new code segment. Due to the physics of flash memory, moving written data around requires relatively significant effort and time. A good algorithm would limit the amount of data movement to efficiently allow code segment storage.

BRIEF DESCRIPTION OF THE DRAWINGS

The present invention is illustrated by way of example and is not limited by the figures of the accompanying drawings, in which like references indicate similar elements, and in which.

DETAILED DESCRIPTION OF THE INVENTION

Embodiments of a method, device, and system to manage segmentation using a rolling window technique are disclosed. In the following description, numerous specific details are set forth. However, it is understood that embodiments may be practiced without these specific details. In other instances, well-known elements, specifications, and protocols have not been discussed in detail in order to avoid obscuring the present invention.

Figure 1:
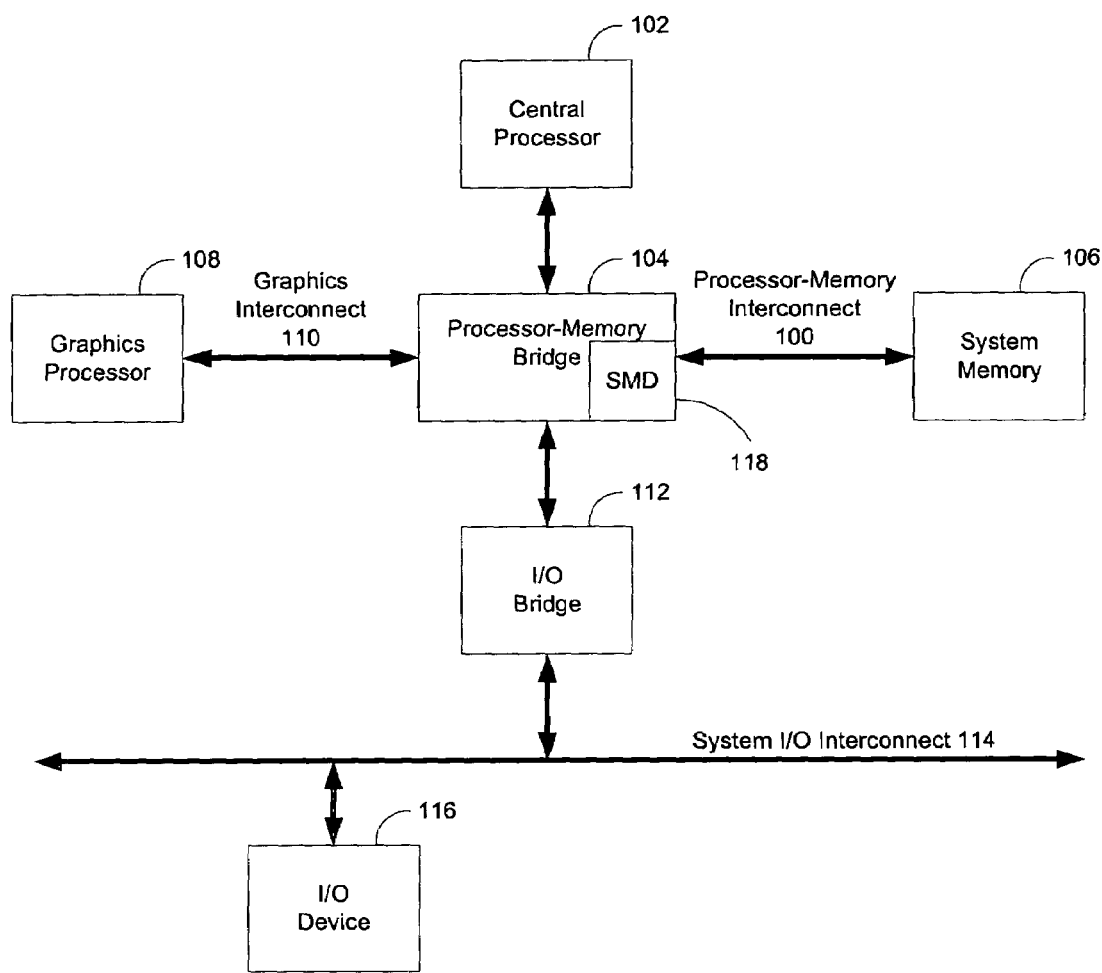
FIG. 1 is a block diagram of one embodiment of a computer system.

FIG. 1 is a block diagram of one embodiment of a computer system. The computer system comprises a processor-memory interconnect 100 for communication between different agents coupled to interconnect 100, such as processors, bridges, memory devices, etc. Processor-memory interconnect 100 includes specific interconnect lines that send arbitration, address, data, and control information (not shown). In one embodiment, central processor 102 is coupled to processor-memory interconnect 100 through processor-memory bridge 104. In another embodiment, there are multiple central processors coupled to processor-memory interconnect (multiple processors are not shown in this figure).

Processor-memory interconnect 100 provides the central processor 102 and other devices access to the memory subsystem. In one embodiment, a system memory controller that controls access to system memory 106 is located on the same chip as processor-memory bridge 104. In another embodiment, a system memory controller is located on the same chip as central processor 102. Information, instructions, and other data may be stored in system memory 106 for use by central processor 102 as well as many other potential devices. In one embodiment, a graphics processor 108 is coupled to processor-memory bridge 104 through a graphics interconnect 110.

I/O devices, such as I/O device 116, are coupled to system I/O interconnect 114 and to processor-memory interconnect 100 through I/O bridge 112 and processor-memory bridge 104. I/O Bridge 112 is coupled to processor-memory interconnect 100 (through processor-memory bridge 104) and system I/O interconnect 114 to provide an interface for a device on one interconnect to communicate with a device on the other interconnect.

In one embodiment, system memory 106 is flash memory. Flash memory is non-volatile memory and thus is able to have data stored without constant applied power. On the other hand, the non-volatile nature of flash memory slows the access times to locations in the memory. Thus, it is beneficial to minimize accesses to flash memory. In one embodiment, flash memory controller located within the processor memory bridge 104 controls access to the memory. In one embodiment, a segmentation management device (SMD) 118 located within the processor memory bridge 104 controls the management of code segments in the flash memory. In one embodiment, the SMD 118 is located within the flash memory controller.

An individual code segment cannot be separated and stored in different locations in memory, thus, each time a code segment is stored in memory it must be stored contiguously. Flash memory segmentation management is crucial to memory access performance when dealing with code segments. One or more code segments currently residing in flash memory must be relocated to different areas of the memory if there is not a contiguous space in flash memory to store an additional code segment.

Figure 2:
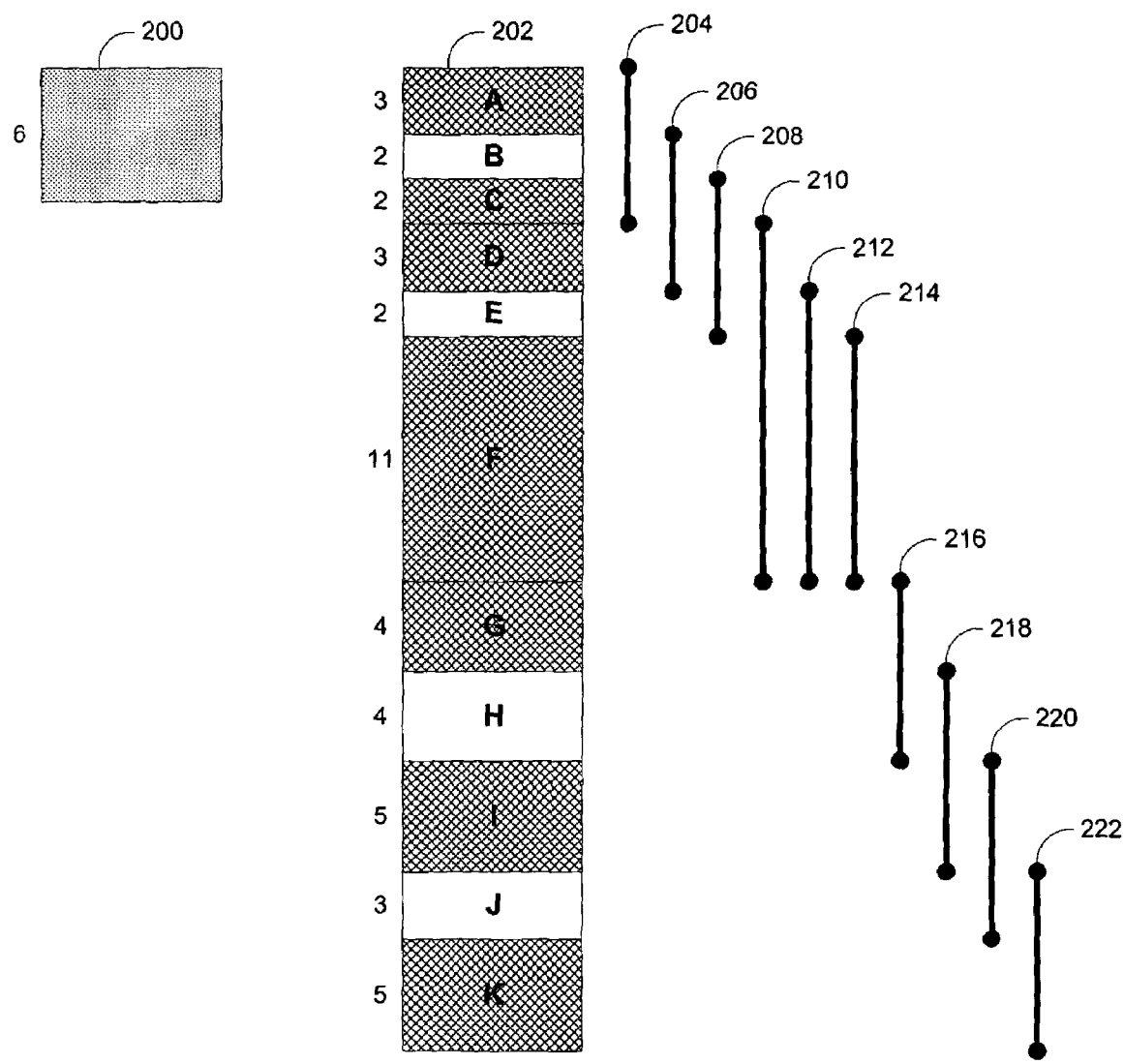
FIG. 2 describes an example embodiment of a rolling window technique used to find all possible locations to store a new code segment in a flash memory.

One way of inserting an additional code segment is through a rolling window technique that finds all feasible locations for storage after relocating one or more code segments currently residing in the memory. FIG. 2 describes an example embodiment of a rolling window technique used to find all possible locations to store a new code segment in a flash memory. In one embodiment, an additional code segment 200 needs to be inserted in flash memory 202. The flash memory 202 stores code segments (cross-hatched memory locations A, C, D, etc) and also has some empty space (memory locations B, E, etc). In this example embodiment, the size of each code segment and each empty space is designated by the number to the left of the flash memory 202. Thus, code segment A has a length of 3, empty space B has a length of 2, and so on.

Unfortunately, in this example embodiment, additional code segment 200 to be inserted has a length of 6 and the largest contiguous empty space in the flash memory 202 only has a length of 4 (memory location H). Therefore, one or more code segments currently residing in flash memory 202 are moved to accommodate the additional code segment 200. The SMD (118 in FIG. 1) employs a rolling window technique to determine all potential locations in flash memory 202 where the additional code segment 200 can be inserted after the relocation of one or more current code segments. The rolling window will systematically check all possible flash memory locations that have a size greater than or equal to the additional code segment 200. The rolling window adds code segments and empty spaces until the size of the window is at least equal to the additional code segment.

Thus, in this example embodiment, the rolling window starts at the first location in memory, code segment A (size 3), adds empty space B (size 2), and finally adds code segment C (size 2) to get the first possible location (rolling window 204) to insert the additional code segment 200. If, for example, this were the location that the SMD decided to insert the additional code segment 200, the first step would be to remove code segment A and code segment C. The result would be an empty space of size 7, big enough to insert the additional code segment 200.

Rather than inserting the additional code segment 200 into this first possible location, the SMD will continue to check all other possible memory locations to find the location that minimizes the cost of insertion. The cost of insertion is the amount of total data movement. The minimum cost would be the least amount of data movement needed in flash memory to insert the additional code segment 200 and also keep all other code segments in flash memory. In the example where rolling window 204 is used, code segments A and C must be relocated to other locations in the flash memory 202 once they are removed to make room for additional code segment 200. Whenever a code segment is removed to make room for another code segment, the SMD then goes through the same rolling window technique process for the newly removed code segment. This process continues to happen until all code segments are relocated into the flash memory or the memory runs out of space to store code segments.

In one embodiment, the cost of moving an individual code segment is just the size of the code segment. In another embodiment, the cost of moving an individual code segment takes into consideration other factors such as the location of the code segment in flash memory. For example, flash memory is comprised of blocks of memory. If a code segment spans two blocks in the flash memory, it is more costly than a code segment that resides in one block. This is because after moving this code segment, the block must be erased before moving any new code segment into that block. If two blocks of flash memory must be erased as a result of moving a code segment (because the segment falls into two blocks) then the cost will be higher than just the code segment's size.

Returning to the rolling window technique as described in FIG. 2, the SMD next moves the rolling window down to the start of the second memory location (empty space B). For this rolling window, empty space B (size 2), code segment C (size 2), and code segment D (size 3) are added together to create another rolling window size of 7 (rolling window 206). Next, the rolling window moves down to the start of the third memory location (code segment C). For this rolling window, code segment C (size 2), code segment D (size 3), and empty space E (size 2) are added together to create another rolling window size of 7 (rolling window 208). Next, the rolling window moves down to the start of the fourth memory location (code segment D). For this rolling window, code segment D (size 3), empty space E (size 2), and code segment F (size 11) are added together to create rolling window size of 16 (rolling window 210). This process is continued until the end of the flash memory 202 (rolling windows 212-222).

The total cost for using each rolling window (204-222) is calculated recursively because there is an entirely new rolling window technique required for each code segment that is removed. The cost is equal to the amount of data that needs to be moved to allow the additional segment to be added and to allow all other segments to remain within flash memory. The rolling window that costs the least, in other words, causes the least amount of data movement, is employed and the SMD will then rearrange the current code segments and insert the new code segment accordingly.

Figure 3:
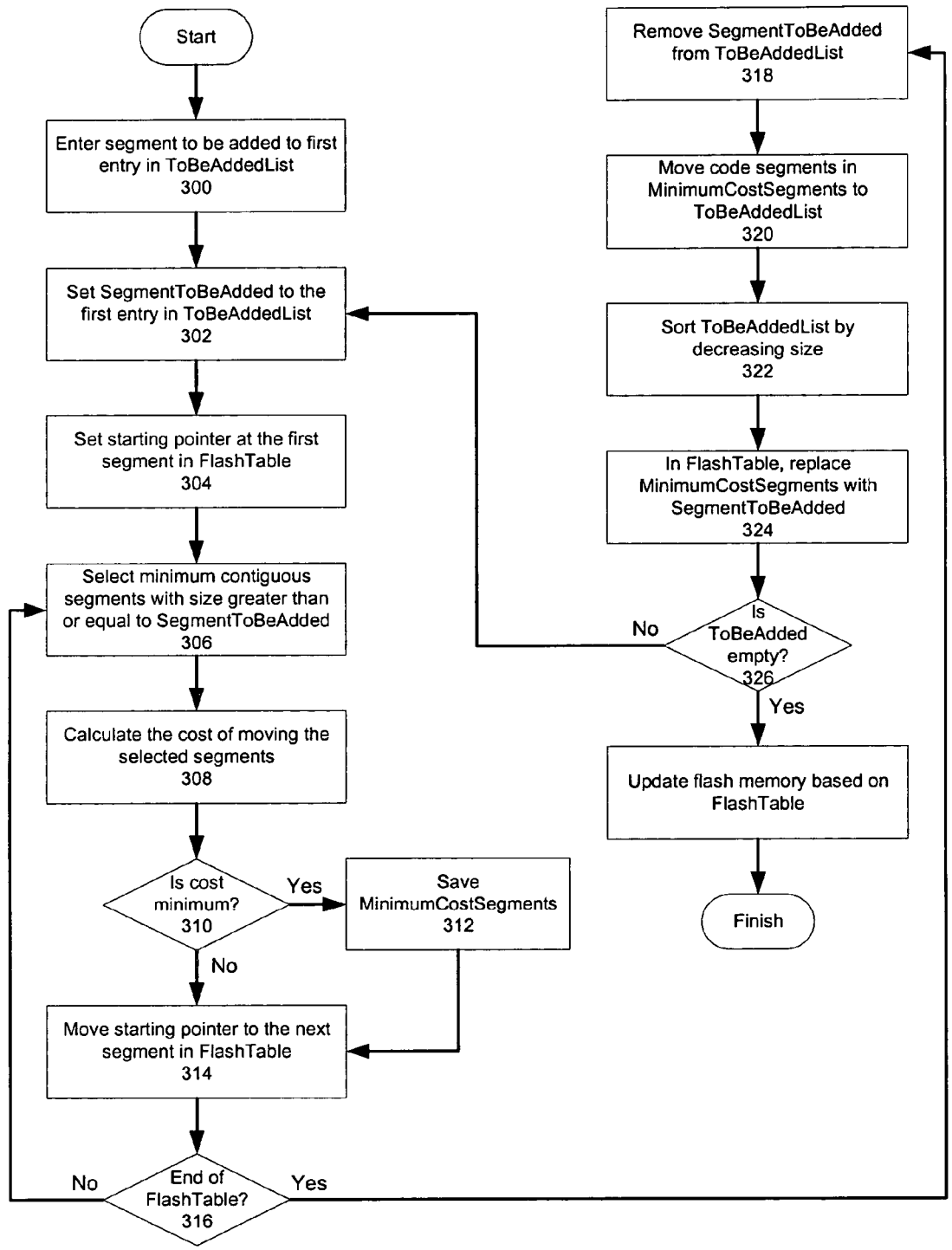
FIG. 3 is a flow diagram of one embodiment of a method to insert a code segment into table of code segments using a rolling window technique.

In one embodiment, the SMD creates a table that represents the code segments in flash memory. In addition, the SMD creates a list that represents all code segments that need to be added to the table (i.e., code segments to be inserted into flash memory). FIG. 3 is a flow diagram of one embodiment of a method to insert a code segment into table of code segments using a rolling window technique. The method is performed by processing logic that may comprise hardware (circuitry, dedicated logic, etc.), software (such as is run on a general purpose computer system or a dedicated machine), or a combination of both. In one embodiment, the method is performed by processing logic residing in the SMD (118 in FIG. 1). In this method, the table that represents the code segments in flash memory is referred to as FlashTable and the list that represents all code segments that need to be added to the FlashTable is referred to as the ToBeAddedList.

Referring to FIG. 3, the method begins by processing logic entering the code segment to be added to the first entry in the ToBeAddedList (processing block 300). Next, processing logic sets the SegmentToBeAdded to the first entry in the ToBeAddedList (processing block 302). In one embodiment, SegmentToBeAdded is a pointer to the actual segment to be added (referred to hereafter as SegmentToBeAdded)). Then, processing logic sets the rolling window starting pointer to the first segment in the FlashTable (processing block 304). Next, processing logic selects the minimum contiguous segments in the FlashTable starting at the starting pointer with a size greater than or equal to the SegmentToBeAdded (processing block 306). Then, processing logic calculates the cost of moving the selected segments (processing block 308). This recursive cost calculation process is described in greater detail above.

Next, processing logic determines if the calculated cost is the minimum cost (i.e., less than any cost that has already been calculated) (processing block 310). If the cost is minimum, then processing logic saves the MinimumCostSegments (processing block 312). In one embodiment, MinimumCostSegments is one or more pointers to the actual segments that are in the current minimum cost rolling window (referred to hereafter as MinimumCostSegments). Next, processing logic moves the starting pointer to the next segment in the FlashTable (processing block 314). This processing block takes place whether or not the cost of the previous window was minimum. Then processing logic determines whether the end of the FlashTable has been reached (processing block 316). If the end has not been reached then processing logic returns to processing block 306 and repeats blocks 306 to 316 again.

If the end of the FlashTable has been reached, then processing logic removes SegmentToBeAdded from the ToBeAddedList (processing block 318). Next, processing logic moves any code segments in MinimumCostSegments to the ToBeAddedList (processing block 320). In one embodiment, if the code segment that was being processed in the ToBeAddedList is able to be inserted into the FlashTable without the removal of any other code segments then MinimumCostSegments is empty during this processing block. Then, processing logic sorts the ToBeAddedList by decreasing size so the largest code segment in the ToBeAddedList is the next code segment to be processed (processing block 322). Next, processing logic replaces any code segments in MinimumCostSegments in the FlashTable with the Segment-ToBeAdded (processing block 324). Then processing logic determines if the ToBeAddedList is empty (processing block 326). If the ToBeAddedList is not empty, then processing logic returns to processing block 302 and continues the process from there. Otherwise, if the ToBeAddedList is empty, then processing logic updates the flash memory based on the current FlashTable (processing block 328) and the method is finished.

Figure 4:
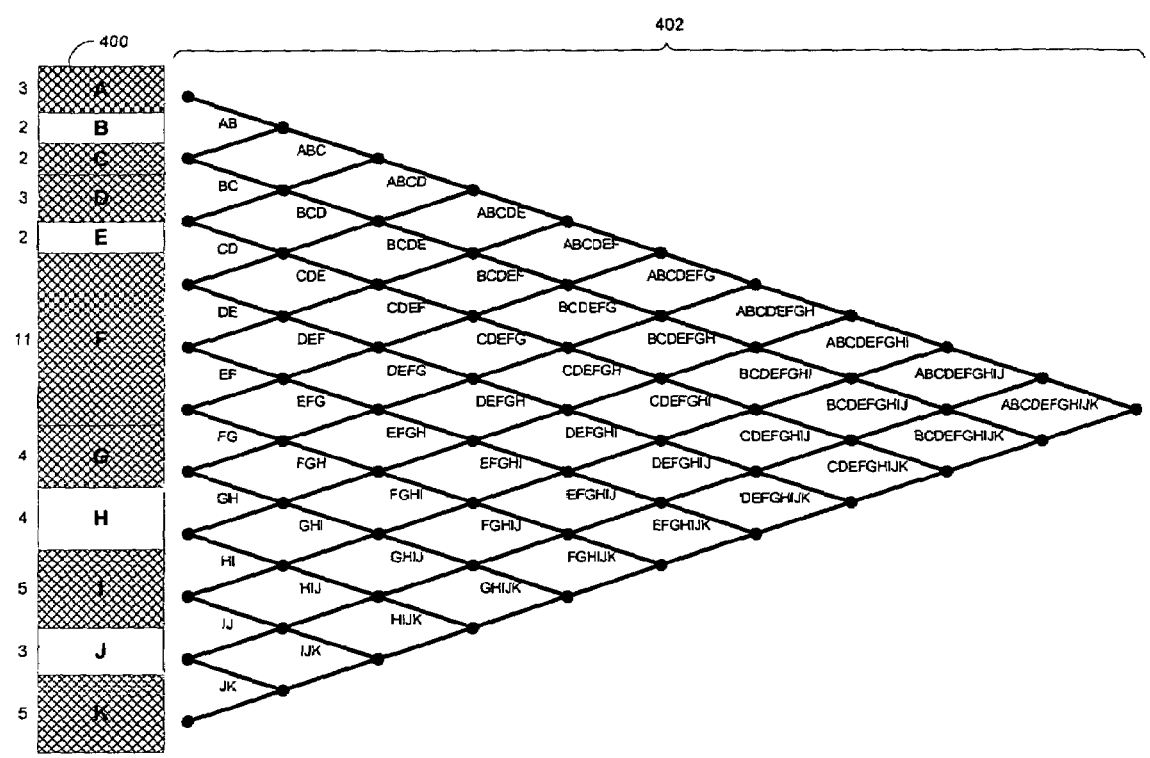
FIG. 4 describes one embodiment of a binary graph representing all possible rolling window code segment combinations of a populated flash memory.

There a number of cost calculations required to update the FlashTable for each additional code segment inserted. Thus, it is beneficial to utilize the rolling window technique to create a data structure that allows for less calculations each time a code segment is added. FIG. 4 describes one embodiment of a binary graph representing all possible rolling window code segment combinations of a populated flash memory. In one example embodiment, a flash memory 400 stores code segments (cross-hatched memory locations A, C, D, etc) and also has some empty space (memory locations B, E, etc). The binary graph 402 represents all possible combinations of code segments to comprise a rolling window. The rolling window can be comprised of a single segment (A-K) or a combination of two or more segments. Thus, from the top left of the tree the first three segments (A, B, and C) can be combined to form AB, BC, or ABC rolling window compositions.

Figure 5:
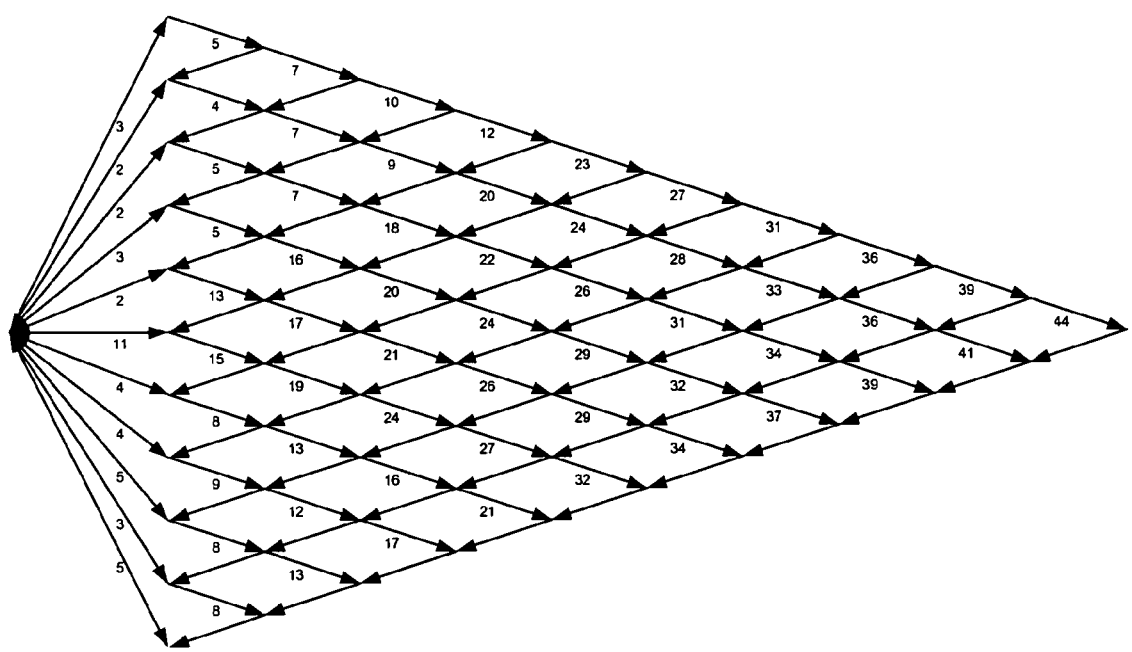
FIG. 5 describes one embodiment of a binary graph representing the rolling window sizes of all code segment combinations of a populated flash memory.

FIG. 5 describes one embodiment of a binary graph representing the rolling window sizes of all code segment combinations of a populated flash memory. The flash memory (400 in FIG. 4) stores code segments (cross-hatched memory locations A, C, D, etc) and also has some empty space (memory locations B, E, etc). In this example embodiment, the size of each code segment and each empty space is designated by the number to the left of the flash memory 400. Thus, code segment A has a length of 3, empty space B has a length of 2, and so on. The graph can be efficiently represented using pointers as depicted in FIG. 5. The directions of the pointers allow proper navigation of the graph.

Figure 6:
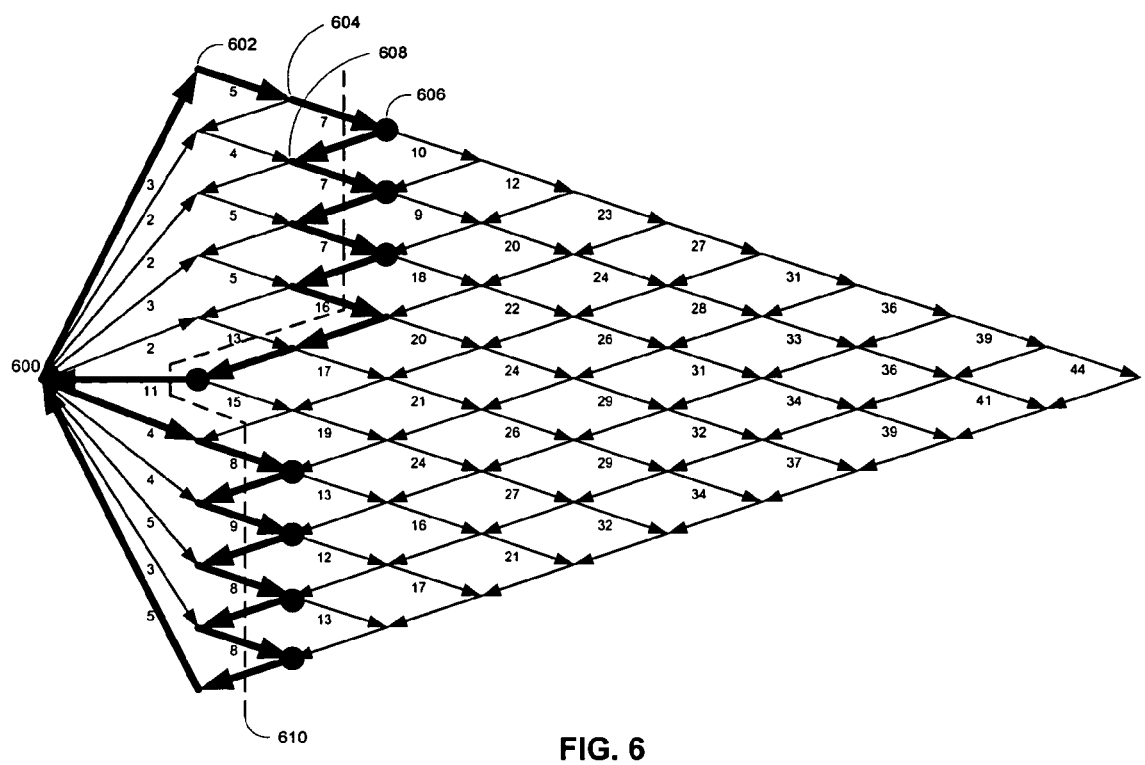
FIG. 6 describes one embodiment of a search process in a binary graph for rolling windows of at least the size of the code segment to be inserted in flash memory.

FIG. 6 describes one embodiment of a search process in a binary graph for rolling windows of at least the size of the code segment to be inserted in flash memory. The search begins at the top of the graph, continuously moving towards the higher levels until the window size exceeds the size of the code segment which is to be inserted. Once the window size exceeds the size of the code segment the search moves toward lower levels of the graph until a node is reached that represents a window smaller than the desired size. The previous node visited before this particular node is the node that represents the proper window size. For example, in one embodiment, a code segment with a size of 6 needs to be inserted into flash memory.

In this embodiment, the search begins at the start of the graph 600 and goes in the direction of the bolder dark arrows. The search moves from the starting node 600, up to the upper left node 602. The size of the window at this point is only 3. The size is represented by the number next to the pointer that is approaching the node from the left side of the node. Since the window is not big enough, the search continues down to node 604 and the size of the window becomes 5. Again, this window is not big enough, so the search moves down to node 606 and the size of the window becomes 7. At this point the size of the window is large enough and the algorithm then searches back down the tree to smaller sizes. Thus, the search continues down to the next node 608 and the size of the window decreases to 4. At this point, the window was big enough at the previous node but now is too small, thus the correct window size to utilize, as described in the algorithm above, is the window size of the previous node 606 (in this case, size 7). The nodes with the correct window sizes are located just to the right of the dotted line 610. The search navigates through the tree and finds all correct window sized nodes (as represented by the large black dots on the graph).

Thus, embodiments of a method, device, and system to manage segmentation using a rolling window technique have been disclosed. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A method, comprising:
   receiving a code segment to be inserted into a flash memory storing code segments;
   selecting one or more contiguous code segments in flash memory with a total size equal to or larger than the received code segment;
   calculating the amount of contiguous code segment data to be removed to insert the received code segment and the cost to relocate the removed code segments to alternate locations in the flash memory; and
   if the amount is minimum,
   moving the one or more selected contiguous code segments and replacing them with the received code segments;
   removing the one or more selected contiguous code segments from a table of code segments;
   placing the one or more selected contiguous code segments in a list of segments to be added to the table;
   placing the received code segment in the table at the location of the one or more removed contiguous code segments; and
   sorting the list by decreasing size of code segments.

2. The method of claim 1, further comprising recursively calculating the amount of code segment data movement required to allow all current code segments to remain in flash memory and the insertion of the received code segment in flash memory.

3. The method of claim 1, wherein the minimum amount of data movement further comprises the least amount of total data to be moved in flash memory required to insert the received code segment and move all of the one or more selected contiguous code segments to other location in flash memory.

4. A device, comprising:
   a memory to store a table of code segments and a list of segments to be added to the table;
   a segment receiving unit to receive a code segment and place the code segment in the list of segments to be added to the table;
   a segment selection unit to select one or more contiguous code segments in the table with a total size greater than or equal to the received code segment;
   a data movement calculation unit to calculate the necessary amount of contiguous code segment data to be removed to insert the received code segment and the cost to relocate the removed code segments to alternate locations in a flash memory; and
   if the calculated amount of data movement is minimum, a segment rearranging unit to move the one or more selected contiguous code segments to one or more different locations in flash memory and replace them with the received code segments;

remove the one or more selected contiguous code segments from the table;

place the one or more selected contiguous code segments in the list;

place the received code segment in the table at the location of the one or more removed contiguous code segments; and sort the list by decreasing size of code segments.

5. The device of claim 4, wherein the segment selection unit is further operable to select one or more contiguous code segments in the table with a total size greater than or equal to the code segment at the top of the list.

6. The device of claim 4, wherein the data movement calculation unit is further operable to recursively calculate the cost of moving the code segments that require rearrangement to allow all current code segments to remain in flash memory when the received code segment is inserted.

7. The device of claim 4, wherein the minimum amount of data movement further comprises the least amount of total data to be moved in flash memory required to insert the received code segment and move all of the one or more selected contiguous code segments to one or more other locations in flash memory.

8. A system, comprising:
an interconnect;
a processor coupled to the interconnect;
a flash memory device coupled to the interconnect;
a memory, coupled to the interconnect, to store
    a table of code segments representing code segments stored in the flash memory device; and
    a list of segments to be added to the table; and
a segmentation management device, coupled to the interconnect, further comprising:
    a segment receiving unit, operable to
    receive a code segment for storage in the flash memory; and
        place the code segment in the list of segments to be added to the table;
    a segment selection unit, operable to select one or more contiguous code segments in the table with a total size greater than or equal to the received code segment;
    a data movement calculation unit, operable to calculate the amount of calculating the amount of contiguous code segment data to be removed to insert the received code segment and the cost to relocate the removed code segments to alternate locations in the flash memory; and
    if the calculated amount of data movement is minimum, a segment rearranging unit operable to
    move the selected contiguous code segment and replace with the received code segment in the flash memory;
    remove the one or more selected contiguous code segments from the table;
    place the one or more selected contiguous code segments in the list;
    place the received code segment in the table at the location of the one or more removed contiguous code segments; and
    sort the list by decreasing size of code segments.

9. The system of claim 8, wherein the segment selection unit is further operable to select one or more contiguous code segments in the table with a total size greater than or equal to the code segment at the top of the list.

10. The system of claim 8, wherein the cost calculation is further operable to recursively calculate the cost of moving the code segments that require rearrangement to allow all current code segments to remain in flash memory when the received code segment is inserted in flash memory.

11. The system of claim 8, wherein the minimum amount of data movement further comprises the least amount of total data to be moved in flash memory required to insert the received code segment and move all of the one or more selected contiguous code segments to one or more other locations in flash memory.

12. The system of claim 8, wherein the system farther comprises one or more additional processors coupled to the interconnect.

* * * * *